W. H. MARTIN.
APPARATUS FOR TESTING CAPACITY OF ELECTRIC CONDUCTORS.
APPLICATION FILED JAN. 22, 1918.

1,375,405.

Patented Apr. 19, 1921.
4 SHEETS—SHEET 2.

INVENTOR.
W. H. Martin
BY
ATTORNEY

W. H. MARTIN.
APPARATUS FOR TESTING CAPACITY OF ELECTRIC CONDUCTORS.
APPLICATION FILED JAN. 22, 1918.

1,375,405.

Patented Apr. 19, 1921.
4 SHEETS—SHEET 3.

INVENTOR.
BY W. H. Martin
ATTORNEY.

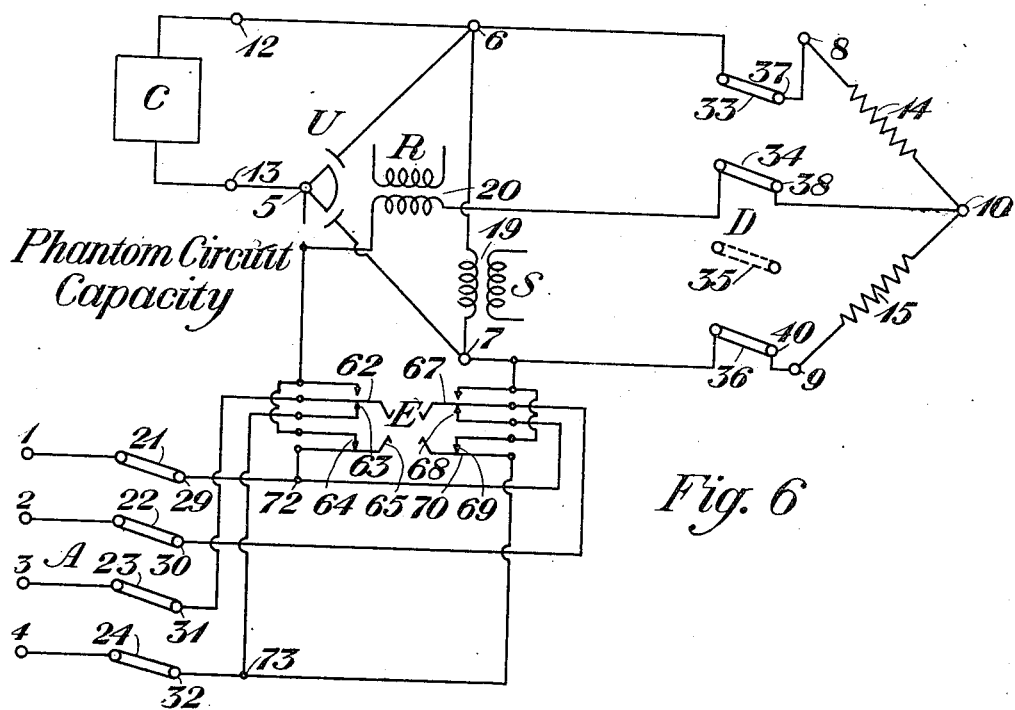
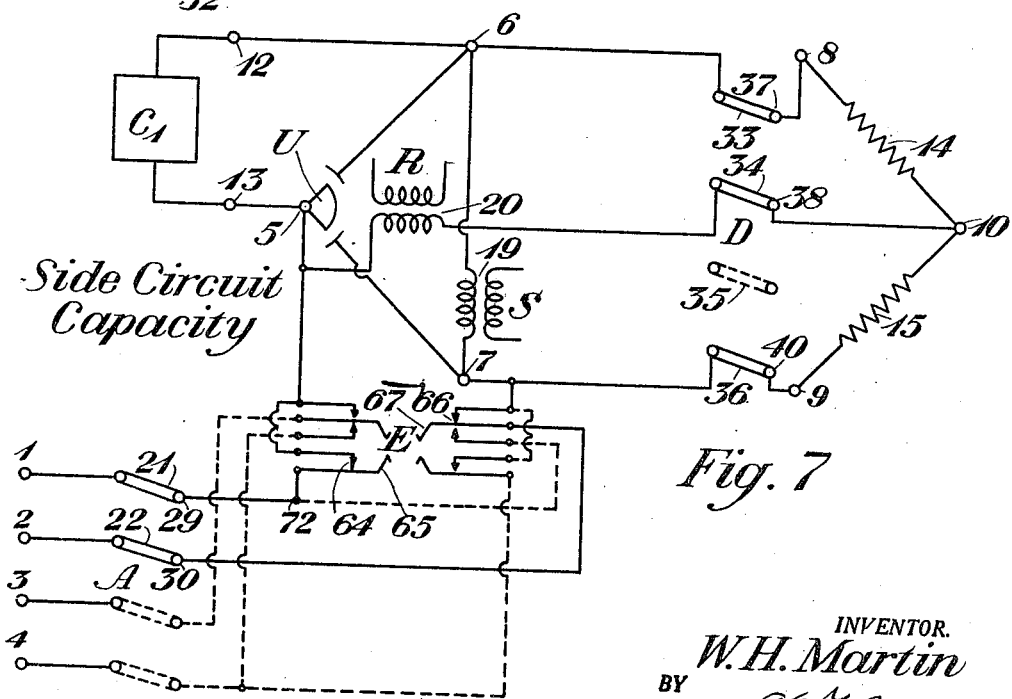

UNITED STATES PATENT OFFICE.

WILLIAM H. MARTIN, OF NEW YORK, N. Y., ASSIGNOR TO AMERICAN TELEPHONE AND TELEGRAPH COMPANY, A CORPORATION OF NEW YORK.

APPARATUS FOR TESTING CAPACITY OF ELECTRIC CONDUCTORS.

1,375,405.

Specification of Letters Patent.    Patented Apr. 19, 1921.

Application filed January 22, 1918. Serial No. 213,174.

*To all whom it may concern:*

Be it known that I, WILLIAM H. MARTIN, residing at New York, in the county of Bronx and State of New York, have invented certain Improvements in Apparatus for Testing Capacity of Electric Conductors, of which the following is a specification.

This invention relates to apparatus for testing the capacity of electrical conductors, and more particularly to apparatus for testing the capacity of the conductors used in loaded cable circuits for telephonic transmission.

In the construction of loaded cable circuits for telephonic transmission, it is customary to arrange the conductors in groups of four called a "quad," each quad consisting of two pairs of conductors. The conductors of each pair are twisted about each other and used as the parallel line conductors of the "side" circuit, the pairs being also twisted about each other and each pair forming one side of the line of a so-called "phantom" circuit. Each section of cable between loading points is made up of a number of lengths which are spliced together and it has been the practice heretofore to test the capacity unbalance of the side and phantom circuits making up the several quads of which each cable length is composed, and then to splice together the side and phantom conductors of quads of adjacent cable lengths in such a manner that the capacity unbalance of the several lengths comprising any given loading section shall tend to neutralize each other, so that the resultant capacity unbalance of the side and phantom circuits of each quad extending between loading points shall be as low as possible. This construction, while tending to reduce the cross-talk between the side circuits and also between side and phantom circuits of the quad of a given loading section, failed to take into account the requirement that in loading lines, the total capacity of each loading section of a transmission circuit should be as nearly equal as possible.

In order to comply with this requirement it is proposed in accordance with this invention to determine both the capacity unbalances and the actual capacity of each side and phantom circuit of a cable length and then splice the conductors of the several quads so as to neutralize the capacity unbalances so far as possible, and at the same time keep the total capacity of each loading section within certain limits.

It is one of the objects of the present invention, therefore, to provide a testing apparatus for determining the unbalance of the side and phantom circuits of each quad and to also determine the actual capacity of each side and phantom circuit in order to facilitate making the splices of the cable lengths in accordance with the method just outlined. The method referred to is not a part of the present invention but is made the subject matter of a separate application filed by H. S. Osborne January 22, 1918, Serial Number 213,192.

The invention will be more fully understood by reference to the accompanying drawings in which:

Fig. 6 is a somewhat simplified diagram of the circuit conditions during a measurement of the capacity of a phantom circuit; and Fig. 7 is a similar diagram of the circuit conditions during a measurement of the capacity of a side circuit.

Figure 1:
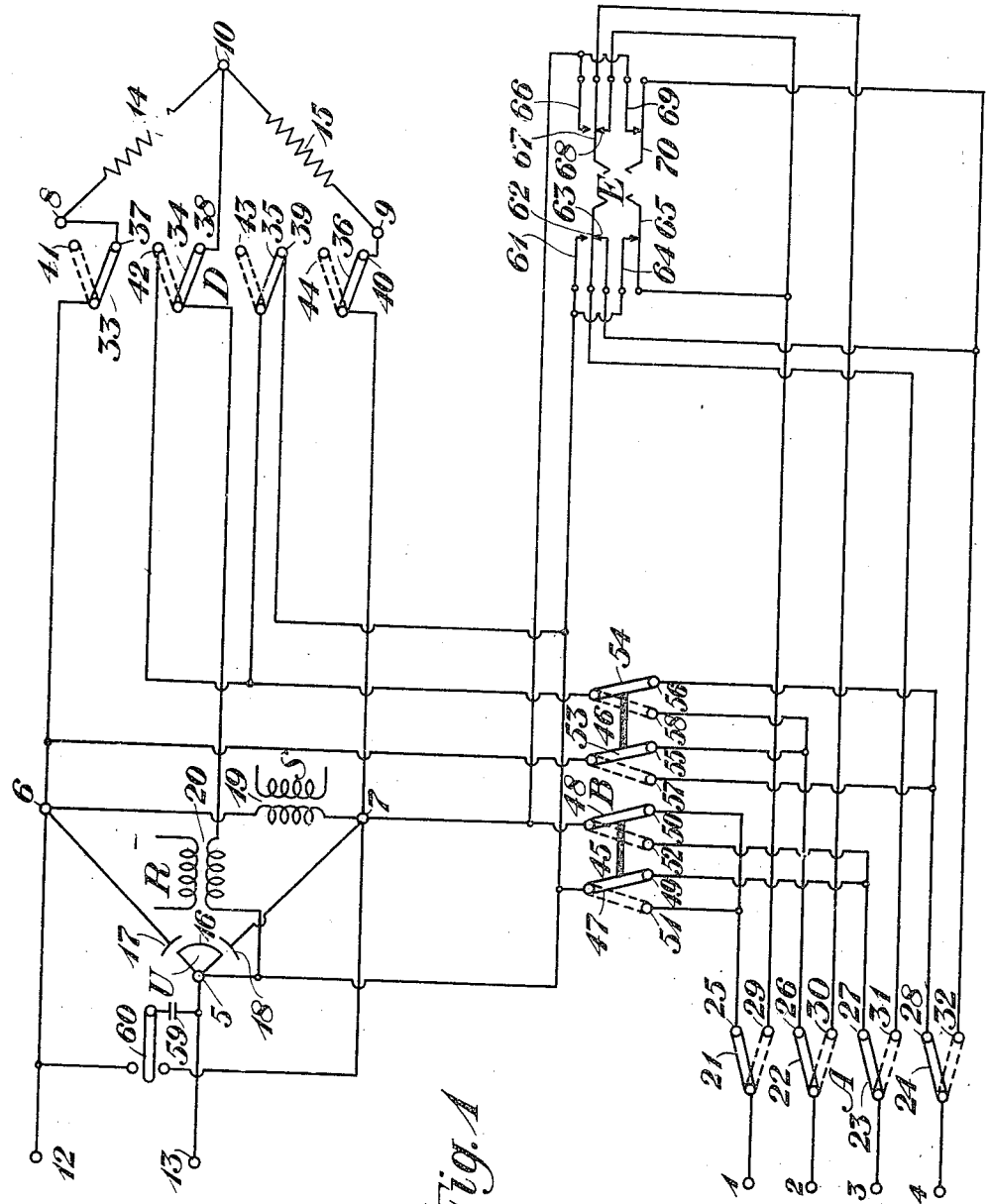
Figure 1 is a detailed diagram of the circuits of the testing set.

Referring to Fig. 1, terminals 1, 2, 3 and 4 are provided to which the four conductors of a quad to be tested may be connected. A Wheatstone bridge arrangement is also provided of which resistances 14 and 15 form two arms connected between points 8 and 10, and 9 and 10 respectively, the other two arms of the bridge being formed by the two halves of an air condenser U. The condenser U is comprised of a plate 16 to which is opposed two plates 17 and 18, the plate 16 being movable about an axis so as to vary the capacity between the plates, producing in effect two separate variable condensers, one of which is connected between the points 5 and 6, the other being connected between points 5 and 7. Terminals 12 and 13 are provided for the attachment of a capacity arrangement which may be set to some arbitrary value approximating that of the circuit to be tested. A source of current variations such as a "howler" is coupled through a transformer 19 to a conductor connecting points 6 and 7 of the bridge while receiving apparatus may be coupled through transformer 20 to a conductor extending between bridge points 5 and 10.

Switches A, B and D as well as a key E are provided for making the various circuit arrangements in connection with the several tests. The switches A and D may be four-point double-throw switches, the switch A comprising four switch arms, 21, 22, 23 and 24, adapted to coöperate with contacts 25, 26, 27 and 28, or contacts 29, 30, 31 and 32 respectively. Similarly switch D comprises switch arms 33, 34, 35 and 36, coöperating with contacts 37, 38, 39 and 40, or contacts 41, 42, 43 and 44 respectively. The switching arrangement B may comprise independently movable halves 45 and 46, each of which is a two-point double-throw switch. The switch 45 comprises switch arms 47 and 48 for coöperation with contacts 49 and 50, or 51 and 52 respectively, while switch 46 comprises two switch arms 53 and 54 for coöperation with contacts 55 and 56, or 57 and 58 respectively.

In making capacity unbalance tests the switch A should be in its upper position, thereby connecting the conductors to be tested over the contacts of the switch B to the Wheatstone bridge arrangement already described. The switch D controls part of the capacity unbalance connections and when in its lower position as shown in Fig. 1 the apparatus is arranged to determine the unbalance between the phantom and a side circuit. When the switch is thrown to its upper position the apparatus is in condition for testing the unbalance between the two side circuits. The switch B also controls part of the unbalance connections when the switch D is in its lower position. When switch B is thrown to the right, the apparatus is arranged to measure the unbalance between the phantom and the side circuit connected to terminals 1 and 2. When B is thrown to the left, the apparatus is arranged to measure the unbalance between the phantom and the side circuit connected to terminals 3 and 4. In making measurements of the actual capacity of a desired circuit the switch A should be thrown to its lower position, thereby connecting the conductors of a quad associated with terminals 1, 2, 3 and 4 through the contacts of key E to the Wheatstone bridge arrangement. The key E has three positions, and when in its normal position with the contacts as shown in Fig. 1, the circuit is arranged for measurement of the capacity of the phantom circuit. When key E is thrown to the right, the apparatus is in condition for measuring the capacity of the side circuit connected to terminals 1 and 2, and when the key is thrown to the left the capacity of the side circuit connected to terminals 3 and 4 may be measured. During the measurement of actual capacities the circuits to be tested are connected over the contacts of the key E to the points 5 and 7 across one arm of the bridge.

A condenser arrangement whose capacity approximates that of the circuit to be measured, is connected to terminals 12 and 13, across the second arm of the bridge. The resistances 14 and 15 form the other two arms of the bridge, it being understood that the switch D is in its lower position as shown in Fig. 1. Inasmuch as the capacity of a phantom circuit is materially greater than that of a side circuit, the condenser arrangement connected to terminals 12 and 13 during a measurement of the phantom capacity should have a greater capacity than that of the condenser arrangement connected to said terminals during a measurement of side circuit capacity or, if desired, a single condenser arrangement may be provided which may be adjusted to the desired value.

With a given circuit connected to points 5 and 7 of the bridge and a condenser arrangement having a capacity approximating that of the circuit to be measured connected to terminals 12 and 13, the air condenser U may be adjusted until the bridge is balanced and by adding to or subtracting from the setting of the condenser arrangement connected to terminals 12 and 13, the reading of the air condenser U, the capacity of the circuit may be obtained. Should the capacity of the condenser arrangement connected to terminals 12 and 13 differ from the capacity of the circuit to be tested by an amount so great that the capacity of the condenser U is insufficient to balance the bridge, a condenser 59, having a fixed value, may be connected by means of a switch 60 in shunt of either one of the halves of the condenser U, and the capacity of said condenser 59 added to the reading of the condenser U.

With this general description of the apparatus in mind, the invention may be fully understood from a description of the operation. Assuming that it is desired to test the capacity unbalance of a section of cable, the four conductors of a quad are connected to the terminals 1, 2, 3 and 4, one pair of conductors of the quad being connected to terminals 1 and 2, and the other pair being connected to terminals 3 and 4. The switch A is then thrown to its upper position with its switch arms resting upon contacts 25, 26, 27 and 28. The switch B may be in any of its possible positions, but for purpose of illustration it will be assumed that both halves of said switch are thrown to the right with the switch arms resting on contacts 49, 50, 55 and 56. If now it is desired to measure the phantom to side unbalance, switch D will be thrown to its lower position with its switch arms resting upon contacts 37, 38, 39 and 40. The circuits as now arranged are shown in simplified form in Fig. 2, the elements not entering into the operation being omitted for the sake of clearness. In order to more clearly understand the circuit conditions now existing, attention is called to the schematic diagram of Fig. 3. The capacity unbalance between the phantom and side circuit is the condition which produces cross-talk between side and phantom circuits. If, then, a source of current variations such as S of Fig. 3 is associated with terminals 1 and 2 corresponding to terminals 1 and 2 of Fig. 2, and receiver R is connected to the mid-points of conductors connecting terminals 1—2 and 3—4 respectively, any unbalance in the capacity between terminals 1—3, 4 and 2—3, 4 respectively indicated in dotted lines in Fig. 3, will result in so-called cross-talk in the receiver. By adjusting the condenser U, the two halves of which are in shunt of the capacities above mentioned, the capacity between points 1—3 and 2—4 may be balanced so that no cross-talk results. The setting of the condenser U will then be a measure of the capacity unbalance between the phantom and one side circuit of the conductors of a quad connected to terminals 1, 2, 3 and 4.

Figure 2:
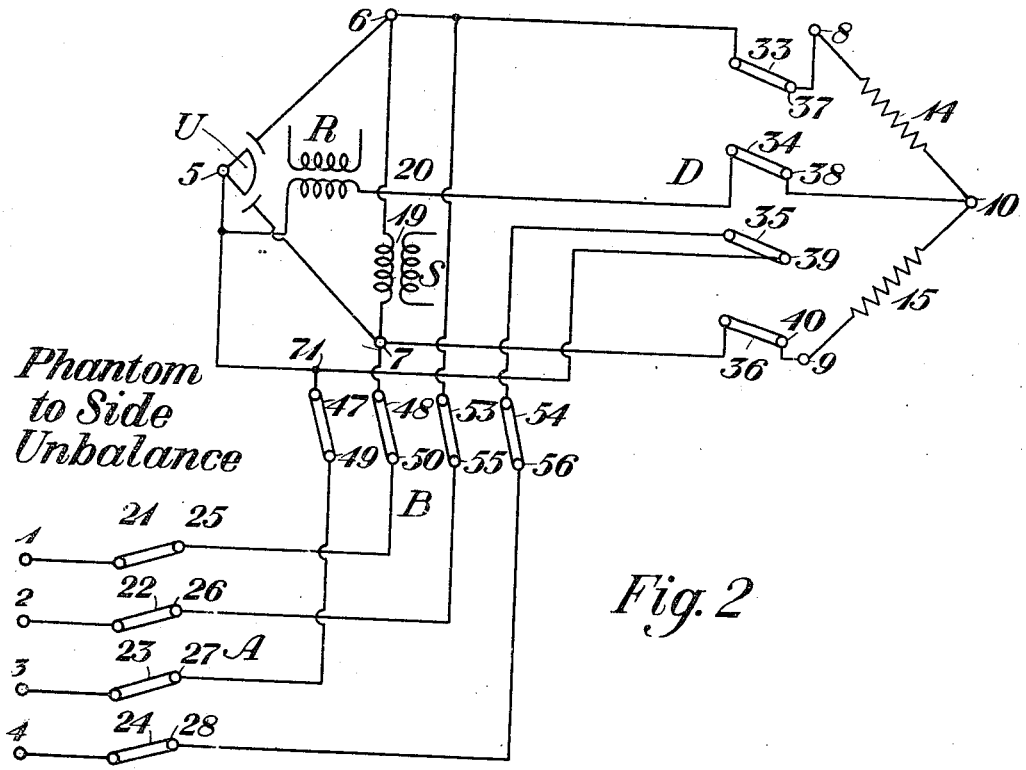
Fig. 2 is a somewhat simplified diagram indicating the circuit conditions during a test of the capacity unbalance between a phantom circuit and a side circuit.
Figure 3:
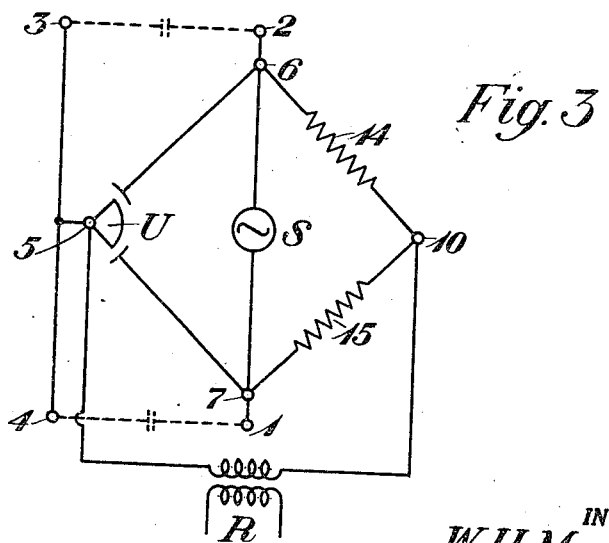
Fig. 3 is a schematic diagram to illustrate the phantom to side unbalance producing cross-talk between phantom and side circuits.

Referring now to Fig. 2, the circuits resulting from the setting of the switches of the apparatus of Fig. 1 as above described, may be traced as follows: The side circuit conductors of the quad connected to terminals 1 and 2 are asosciated with a source S over a circuit from terminal 1, over switch arm 21, contact 25, contact 50, switch arm 48, point 7, secondary of induction coil 19, point 6, switch arm 53, contact 55, contact 26, switch arm 22, to terminal 2. Said conductors are also connected in parallel to one terminal of a receiving circuit as follows: From terminals 1 and 2 in parallel, over switch arms 21 and 22, contacts 25 and 26, contacts 50 and 55, switch arms 48 and 53, switch arms 33 and 36, contacts 37 and 40, resistances 14 and 15, to common point 10. Common point 10 is connected over contact 38 and switch arm 34 to one terminal of the secondary of an induction coil 20 associated with the receiver. The conductors of the quad connected to terminals 3 and 4 are connected in parallel to the opposite terminal of the receiver circuit, the connection for the upper conductor extending from terminal 3 over the switcharm 23, contact 27, contact 49 and switcharm 47 to common point 71, while the connection for the lower conductor extends from terminal 4, over switcharm 24, contact 28, contact 56, switcharm 54, switcharm 35 and contact 39, to common point 71. From common point 71 the circuit is connected to the opposite terminal of the secondary of induction coil 20. It will thus be seen that the two pairs of conductors are connected in parallel to the opposite terminals of the receiver circuit, and that the circuit connections are substantially those shown in schematic form in Fig. 3. By adjusting the condenser U until no sound occurs in the receiver, the setting of said condenser will be a measure of the unbalance between the phantom circuit and the side circuit connected to terminals 1—2. If it is desired to determine the unbalance between the phantom circuit and the side circuit connected to terminals 3 and 4, the two halves of the switch B may be thrown to the left, (see Fig. 1) whereby the conductors of said side circuit are associated with the source S over a circuit from terminal 3, switcharm 23, contact 27, contact 52, switcharm 48, point 7, secondary of induction coil 19, point 6, switcharm 53, contact 57, contact 28 and switcharm 24, to terminal 4. The phantom connections will be similar to those already described.

Figure 4:
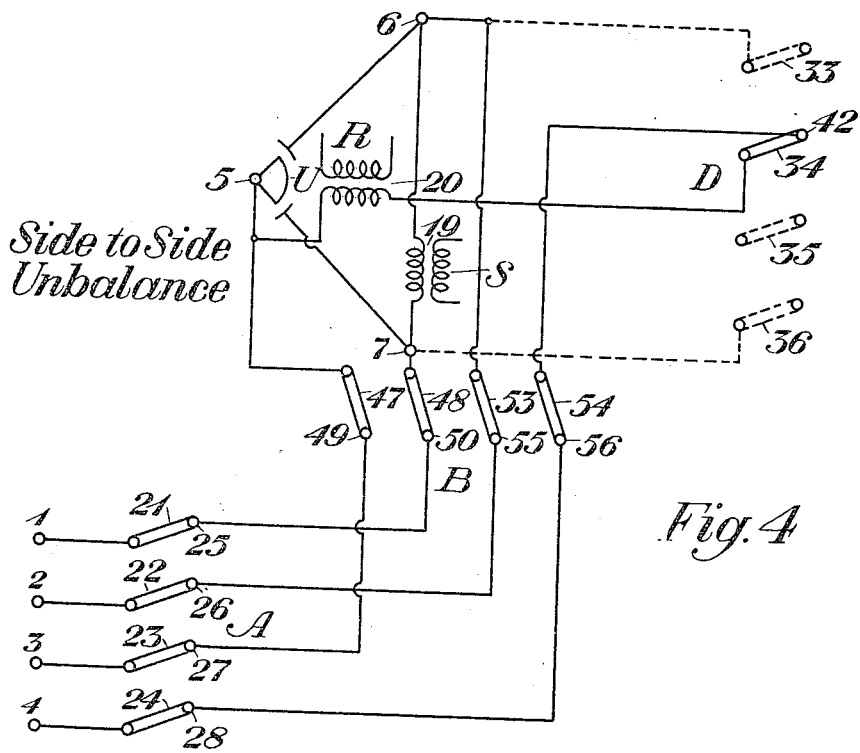
Fig. 4 is a diagram similar to that of Fig. 2 but showing the circuit conditions during a test of the capacity unbalance between two side circuits.
Figure 5:
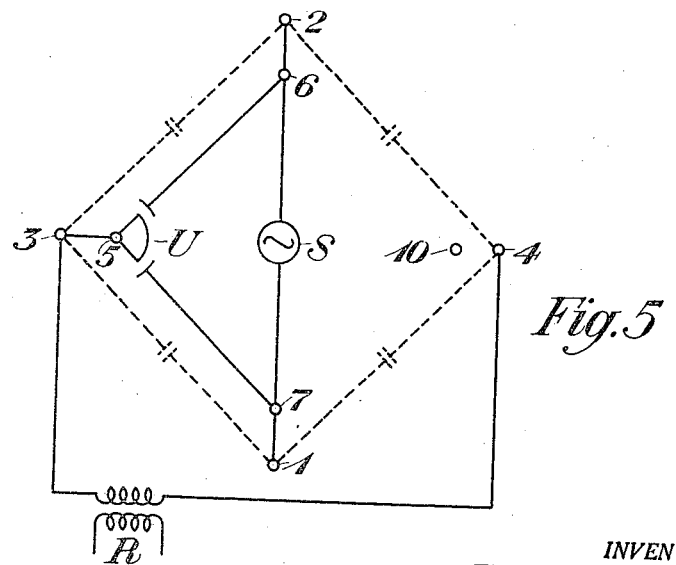
Fig. 5 is a schematic diagram to illustrate the side to side unbalance producing cross-talk between adjacent side circuits.

If it be desired to determine the capacity unbalance between the two side circuits, switch A should be permitted to remain in its upper position, switch B being thrown to the right and switch D being thrown to its upper position, the resultant circuit arrangement being shown in simplified form in Fig. 4 in which the elements not coöperating in this test are omitted. In order to more clearly understand the circuit conditions now existing, attention is called to the schematic diagram shown in Fig. 5 which illustrates the conditions causing cross-talk between side circuits. Assuming that a source of current is bridged across terminals 1 and 2 of one side circuit, and a receiver R is bridged across the terminals 3 and 4 of the other side circuit, the capacity between the several conductors of the quad would be as indicated in dotted lines in Fig. 5. These capacities are in effect connected between terminals 1—3, 1—4, 2—3, and 2—4, the resultant circuit being a Wheatstone bridge, the arms of which constitute the capacities connected across the several terminals of the quad. Any unbalance of the arms of this bridge causes corresponding cross-talk in the receiver. If now the condenser U be connected as shown with its halves in parallel with two arms of the bridge, by adjusting said condenser until a balance is obtained, the setting of the condenser will indicate the capacity unbalance.

Referring now to Fig. 4 in which the circuit condition resulting from the setting of the switches last described is illustrated, it will be noted that a source of current S is connected across terminals 1 and 2 by a circuit extending from terminal 1 over switcharm 21, contact 25, contact 50, switcharm 48, point 7, secondary of induction coil 19, point 6, switcharm 53, contact 55, contact 26, switcharm 22 to terminal 2. The receiver R is bridged across terminals 3 and 4 by a circuit extending from terminal 3 over switcharm 23, contact 27, contact 49, switcharm 47, secondary of induction coil 20, switcharm 34, contact 42, switcharm 54, contact 56, contact 28 and switcharm 24 to terminal 4. The upper half of condenser U is bridged across terminals 2 and 3 by a circuit extending from terminal 2, over switcharm 22, contact 26, contact 55, switcharm 53, point 6, upper half of condenser U, point 5, switcharm 47, contact 49, contact 27 and switcharm 23 to terminal 3. Likewise the lower half of condenser U is bridged across terminals 1 and 3 by a circuit extending from terminal 1 over switcharm 21, contact 25, contact 50, switcharm 48, point 7, lower half of condenser U, point 5, switcharm 47, contact 49, contact 27 and switcharm 23, to terminal 3. By adjusting condenser U until a balance is obtained, the capacity unbalance will be indicated by the setting of the condenser.

If it is desired to measure the actual capacity of the various circuits, switch A should be thrown to its lower position with its switcharms resting on contacts 29, 30, 31 and 32, thereby connecting the conductors of the quad to the contacts of the key E, instead of to the switch B, which now performs no function. The switch D should be restored to its lower position, the resultant circuit arrangement being indicated in simplified form in Fig. 6. As shown in said figure a condenser arrangement C is connected to terminals 12 and 13 thereby forming one arm of the bridge, while the circuit whose capacity is to be measured is connected across points 5 and 7 over the contacts of key E, said circuit thereby constituting the second arm of the bridge. The halves of the condenser U are connected between the points 5 and 6, and 5 and 7 respectively in parallel with the condenser arrangement C and the circuit to be measured. The resistances 14 and 15 are connected over arms 33 and 36 respectively of the switch D to the points 6 and 7, and thereby constitute the other two arms of the bridge. The source of current variations S is connected through induction coil 19 to points 6 and 7 as in the standard Wheatstone bridge arrangement, while the receiver R is connected through the induction coil 20 to a conductor extending over switcharm 34 and contact 38 of switch D between the other two points 5 and 10 of the bridge. Assuming it is desired to measure the capacity of the phantom circuit, key E is permitted to remain in its middle or unactuated position and the condenser arrangement C is set to a capacity approximating that of the phantom circuit to be measured, said capacity being determined either by previous experience in the measurement of similar circuits, or by a number of trials in the measurement of the particular circuit in question.

Referring to Fig. 6, it will be seen that the conductors associated with terminals 1 and 2 are connected in parallel to point 5 of the bridge, while the conductors associated with terminals 3 and 4 are connected in parallel to point 7 of the bridge. The circuit from terminals 1 and 2 is as follows: From terminal 1 over switcharm 21 and contact 29 to common point 72 and in parallel therewith from terminal 2 over switcharm 22, contact 30, contacts 67 and 68 of key E, to point 72, from which the circuit continues over contacts 65 and 64 of key E to point 5 of the bridge. Similarly the circuit from contacts 3 and 4 extends from terminal 3 over switcharm 23, contact 31, contacts 62 and 63 of key E, to common point 73, and in parallel therewith from terminal 4 over switcharm 24 and contact 32 to common point 73, from which point the circuit continues over contacts 70 and 69 of key E to point 7 of the bridge. By adjusting the condenser U until the bridge is balanced, and adding to or subtracting from the setting of the condenser arrangement C, the reading of the condenser U, the capacity of the conductors may be determined.

If it is desired to measure the capacity of the side circuit connected to terminals 1 and 2, the key E is thrown to the right and the condenser arrangement C adjusted to a value approximating the capacity of the circuit to be measured, or if desired, another condenser arrangement $C_1$ having the desired capacity may be substituted for the condenser arrangement C and connected to the terminals 12 and 13. The circuits as now arranged are indicated in simplified form in Fig. 7, in which the source S and the receiver R are connected to the points of the bridge as described in connection with Fig. 6 while the side circuit associated with terminals 1 and 2 is connected to points 5 and 7 of the bridge, over a circuit as follows: From terminal 1, switcharm 21, contact 29, point 72, contacts 65 and 64 of key E to point 5 of the bridge, and from terminal 2 over switcharm 22, contact 30, contacts 67 and 66 of key E to point 7 of the bridge. The condenser U may now be adjusted to balance the bridge, and by adding to or subtracting from the capacity of the condenser arrangement $C_1$ the setting of the condenser $C$, the capacity of the side circuit may be determined. In the same manner, by throwing key E to the left, the capacity of the side circuit associated with conductors 3 and 4 may be determined.

From the preceding description it is apparent that by this invention a simple and efficient apparatus has been devised, which by a few manipulations of moving parts may be adjusted to make both capacity unbalance and actual capacity measurements of the side and phantom circuits of a group of conductors, and while the invention has been illustrated as embodied in a certain specific form, it will be understood that it is capable of embodiment in many and varied structures without departing from the spirit of the appended claims.

What is claimed is:

1. A testing apparatus comprising a Wheatstone bridge arrangement, an adjustable capacity forming one arm of the bridge, a circuit to be tested forming another arm of the bridge, and means included in part in each of said arms to adjust said capacity until the bridge is balanced.

2. A testing apparatus comprising a Wheatstone bridge arrangement, a network comprising adjustable capacity elements forming one arm of the bridge, a circuit to be tested forming another arm of the bridge, certain of said capacity elements being adjustable to a setting approximating the capacity of said circuit, and other of said elements being adjustable to balance the bridge, whereby the capacity of said circuit may be determined.

3. A testing apparatus comprising a plurality of conductors capable of arrangement in phantom and side circuit relation, means to arrange said conductors in phantom circuit relation with certain of said conductors in side circuit relation, a current source and a receiving device, and means to associate the one with the phantom circuit and the other with the side circuit thereby producing a cross-talk effect in the receiver, means for balancing out said cross-talk effect and thereby indicating the capacity unbalance between the phantom and side circuit, a capacity set with which said conductors are to be compared and means to balance the difference between the capacity of said conductors and said set.

4. A testing apparatus comprising a plurality of conductors capable of arrangement in phantom and side circuit relation, means to arrange said conductors in phantom circuit relation with certain of said conductors in side circuit relation, a current source and a receiving device, and means to associate the one with the phantom circuit and the other with the side circuit thereby producing a cross-talk effect in the receiver, means for balancing out said cross-talk effect and thereby indicating the capacity unbalance between the phantom and side circuit, means to associate said conductors in side circuit relation, with said current source and receiving means connected the one to one circuit and the other to another circuit, thereby producing cross-talk effect on the receiver, means to balance out the cross-talk effect and thereby indicate the unbalance between the side circuits, a capacity set with which said conductors are to be compared and means to balance the difference between the capacity of said conductors and said set.

In testimony whereof, I have signed my name to this specification this fourteenth day of January, 1918.

WILLIAM H. MARTIN.